US012214763B2

(12) United States Patent
Sundquist

(10) Patent No.: US 12,214,763 B2
(45) Date of Patent: Feb. 4, 2025

(54) VEHICLE CHOCK SYSTEM

(71) Applicant: Zane Sundquist, Stuart, FL (US)

(72) Inventor: Zane Sundquist, Stuart, FL (US)

( * ) Notice: Subject to any disclaimer, the term of this patent is extended or adjusted under 35 U.S.C. 154(b) by 350 days.

(21) Appl. No.: 17/728,141

(22) Filed: Apr. 25, 2022

(65) Prior Publication Data
US 2023/0064569 A1 Mar. 2, 2023

Related U.S. Application Data

(60) Provisional application No. 63/237,154, filed on Aug. 26, 2021.

(51) Int. Cl.
*B60T 3/00* (2006.01)
(52) U.S. Cl.
CPC ..................... *B60T 3/00* (2013.01)
(58) Field of Classification Search
CPC ........................................................ B60T 3/00
USPC ................................................... 188/4 R, 32
See application file for complete search history.

(56) References Cited

U.S. PATENT DOCUMENTS

| 3,176,798 | A | * | 4/1965 | Nesselberger | B60T 3/00 188/4 R |
| 3,371,485 | A | * | 3/1968 | Reichard | B60T 13/52 188/106 P |
| 3,722,631 | A | * | 3/1973 | Lowrie | B60T 3/00 188/4 R |
| 4,354,580 | A | * | 10/1982 | Delasantos | B60T 1/14 188/4 R |
| 5,497,857 | A | * | 3/1996 | Warren | B60T 1/14 188/4 R |
| 5,901,816 | A | * | 5/1999 | Camilleri | B60T 3/00 188/4 R |
| 6,378,956 | B1 | * | 4/2002 | Van De Walker | B60T 3/00 188/4 R |
| 6,957,722 | B1 | * | 10/2005 | Baskerville, Sr. | B60T 3/00 188/4 R |
| 10,131,328 | B2 | * | 11/2018 | Breakfield | B60T 3/00 |

FOREIGN PATENT DOCUMENTS

| EP | 3272594 A1 * | 1/2018 | ............ B60R 25/09 |
| GB | 2330386 A * | 4/1999 | ............ B60P 3/077 |

* cited by examiner

*Primary Examiner* — Christopher P Schwartz
(74) *Attorney, Agent, or Firm* — Brennan, Manna & Diamond, LLC

(57) ABSTRACT

A wheel chock system having an automatically deployable wheel chock for preventing the movement of a vehicle wheel is disclosed herein. The system attaches to a semi-trailer or other vehicle, and may be powered by the existing air brake system of the vehicle. The system enables the wheel chock to descend from a stowed position to a deployed position, immediately in front of or behind the vehicle wheel and on the ground surface, or vice versa. The system may be further comprised of an actuation means in the cab of the vehicle for activating or deactivating the wheel chocks, a detection means for detecting whether the chocks are in a stowed or deployed position and a visual or audible indicator for alerting the user as to the positioning of the chock(s).

8 Claims, 6 Drawing Sheets

VEHICLE CHOCK SYSTEM

CROSS-REFERENCE TO RELATED APPLICATION

The present application claims priority to, and the benefit of, U.S. Provisional Application No. 63/237,154, which was filed on Aug. 26, 2021, and is incorporated herein by reference in its entirety.

FIELD OF THE INVENTION

The present invention relates generally to a new and improved wheel chock system for preventing the movement of a vehicle wheel. More specifically, the invention relates to a system that mounts to the underside of a vehicle/trailer, wherein the system is powered by the existing air brake system of the vehicle or other electric/manual powering means. The system is further comprised of a plurality of cradles which house the wheel chocks when not in use, wherein the chocks can be deployed from the cradles on demand from the cab of the vehicle via a worm drive. The system is also comprised of a plurality of sensors and an LED display that notifies a user of the real-time status of the chock position (e.g. retraction or deployment). Accordingly, the present specification makes specific reference thereto. However, it should be appreciated that aspects of the present invention are also equally amenable to other like applications, devices and methods of manufacture.

BACKGROUND OF THE INVENTION

By way of background, wheel chocks are used to prevent the accidental or unintended movement of a vehicle wheel in a plurality of scenarios, and are typically comprised of a concave metal or plastic wedge-like body that is further comprised of a contour that opposes the contour of the vehicle wheel, thereby preventing the wheel from rolling forward/backward (depending on the placement of the chock in front of, or behind a wheel). Chocks are oftentimes used to secure trailers that are not attached to a vehicle to ensure that, for example, an external force cannot cause the trailer to begin to roll. Chocks may also be used on a vehicle, such as a semi-truck/semi-trailer, if parked on a steep incline or other scenario wherein the chock acts as a safety or redundancy device that compliments the existing parking brake of the vehicle in case of, for example, parking brake failure.

As previously stated, existing wheel chock devices are typically comprised of a concave metal or plastic wedge-like body that is comprised of a contour that opposes the contour of the vehicle wheel. Albeit an effective means to prevent the accidental travel of one or more vehicle wheels, existing wheel chocks are far from optimal in terms of convenience and efficiency due to their inherent construction and features, or lack thereof. For example, existing vehicle chocks often lack a means to be readily attached to a vehicle, such that the chock(s) can be easily stored and accessed for use. As a result of the absence of such a means, wheel chocks may often be lost, misplaced or easily left behind by users who forget to return the chocks to the cab of a semi, or wherever said user chooses to store the chocks on the semi-truck/trailer. Further, stored chocks could become dislodged while driving if not properly secured, or if said securing means fails, thereby causing a substantial hazard to other motorists in the form of the chock entering the roadway from a moving vehicle.

Further, existing wheel chocks known in the art must be manually positioned and removed individually by a user before and after each use. This process can be unnecessarily time-consuming, and generally inefficient. The placement/removal of a wheel chock also requires a user to bend down to the level of the surface the wheel rests on to properly position the chock in front/behind each wheel. For some users, specifically those who may be older or have mobility issues, this action may not be possible, or has great potential to cause the user pain/irritation. Also, repetitive use injuries may could occur from continuously deploying and stowing chocks.

Therefore, there exists a long felt need in the art for an improved wheel chock system. There is also a long felt need in the art for an improved wheel chock system that overcomes the limitations of existing similar devices, namely by providing a means to easily and readily secure a chock to the vehicle so that it is not lost or misplaced. Finally, there is a long felt need in the art for an improved wheel chock system that does not require that a user physically place or remove the chock in any fashion.

The present invention, in one exemplary embodiment, comprises a wheel chock system that attaches to a semi/semi-trailer or other vehicle, wherein the system may be powered by the existing air brake system of the vehicle, an electric powering means or a manually-actuated powering means. In each instance, the powering means automatically descends the wheel chocks from a stored position above the vehicle wheels to a position immediately in front of or behind said wheels on the ground surface. The system is further comprised of a cradle that retains the wheel chock in a stored position above the wheel(s) of a vehicle until the same is needed. The cradle is further comprised of a tether cable or chain that is connected to the chock, which allows the chock to descend from the cradle via a worm drive mechanism that is powered by, for example, the air brake of the vehicle, an electric motor or manual crank power, and into a position in front of or behind the vehicle wheel on the ground surface. Further, the device is preferably comprised of a control/actuation means in the cab of the vehicle, wherein the user can be notified if the chocks are deployed or inactive via an LED light board or other notification means.

In this manner, the improved wheel chock device of the present invention accomplishes all of the forgoing objectives, thereby providing a user with a means to readily secure one or more wheel chocks to a vehicle or vehicle trailer. The device also enables a user to position one or a plurality of wheel chocks simultaneously, via a means that does not require any physical involvement or action by the user other than the actuation of a button from within the vehicle cab.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, is an improved wheel chock system comprised of at least one wheel chock, but preferably two or more wheel chocks, wherein each chock is affixed to the system on the driver's side of a semi-truck/vehicle on the cab/trailer underbody or other similar structure. The system is further comprised of a cradle that secures the wheel chock in a user-selected position in front of and above and/or behind and above a vehicle wheel, wherein the cradle is further comprised of a metal-coated or plastic-coated steel cable that secures and retains the chock within the cradle until needed. When activated, the cable allows the chock to be lowered from the cradle into a position in front of or behind a vehicle wheel at ground level, via a worm drive that is powered by a select one of an existing air brake system of the vehicle, an electric powering means or a manually-actuated powering means. The system is further comprised of a vehicle cab control means which allows the user to lower/retract the chocks from an operative or inoperative position via a button, and a plurality of sensors that detect if the chock is currently being retained within the cradle or if it is deployed. Nonetheless, the button could actually be built into or piggy back the air brake actuator, and the LED lights would display on the face of this button (e.g., an approximately 2" square plastic button oriented as a diamond). The sensors are in electrical communication with an LED light board positioned within the vehicle cab, wherein a green LED indicates that the chock is in a stowed position and that the vehicle can be moved, and a red LED indicates that the chock is in a deployed position and that the vehicle cannot be moved.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

DETAILED DESCRIPTION

The innovation is now described with reference to the drawings, wherein like referenced numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The device of the present invention is designed to allow a user to position at least one wheel chock in front of or behind a vehicle or trailer wheel via a wheel chock system. The system can be retrofitted to existing vehicles/semi-trucks/semi-trailers/trailers, and is preferably powered by the existing air brake system of the semi/vehicle. The system may also be comprised of a plurality of redundant powering means, such as an electric motor/generator that can be stored on the exterior of the vehicle or within the vehicle cab. Another powering means may be a manually-actuated powering mechanism, such as a handle and cranking system.

Figure 1:
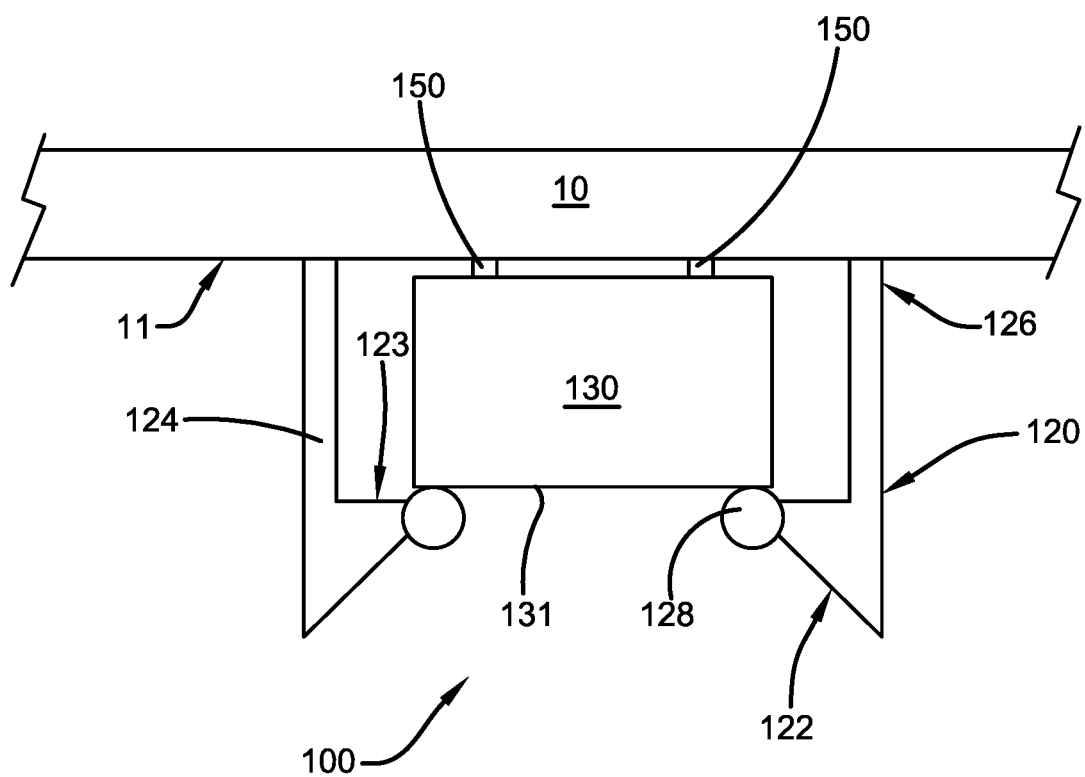
FIG. 1 illustrates a perspective view of one potential embodiment of the retractor and wheel chock of the improved wheel chock system of the present invention in a stowed position and attached to the underside of a trailer bed in accordance with the disclosed architecture.

Referring initially to the drawings, FIG. 1 illustrates a perspective view of the retractor arms 120 and wheel chock 130 of the improved wheel chock system 100 in a stowed position, while attached to the underside 11 of a trailer bed 10. It is contemplated that the system 100 can be permanently or temporarily affixed to the underside 11 surface of a vehicle or vehicle trailer 10, such as but not limited to a semi-trailer. Specifically, the retractor arms 120 and cradle 140 are preferably positioned in the area immediately in front, immediately behind or in front and behind the vehicle wheels 12 on the underside 11 surface of a trailer bed 10 or vehicle. In the preferred embodiment of the device 100, the arms 120 and cradle 140 are preferably positioned on the driver's side of the vehicle/trailer, with one set of arms 120 and related chock 130 positioned in front of a vehicle wheel 12, and a second set of arms 120/chock 130 positioned behind the vehicle wheel 12. It is contemplated that many other positional arrangements of the arms 120, chock 130 and cradle 140 may exist on the underside 11 of a trailer bed 10 or vehicle underside, including but not limited to: behind and in front of each wheel 12, or only in front or behind select wheels 12 on select sides of the trailer 10 or vehicle. However, it is contemplated that the arms 120, chock 130 and cradle 140 are positioned around/near at least one wheel 12 of a vehicle or trailer 10 in any embodiment of the system 100.

The retractor arms 120 serve as one element that retains the wheel chock 130 in a stowed position within the cradle 140. However, in differing embodiments of the system 100, the arms 120 may be housed within a cradle 140. The arms 120 are preferably made of a durable metal, such as but not limited to: stainless steel or aluminum, and are further comprised of a first end 122 having a relatively flat surface 123. The flat surface 123 acts as a level surface for the bottom surface 131 of the chock 130 to be supported by the arms 120 when in a stowed position. The first end 122 of the arms 120 may be generally triangular in shape, half triangular in shape, or any other shape that comprises a flat surface 123. The first end 122 of the arms 120 is also comprised of at least one pair of wheels 128, whose purpose will become fully apparent when discussing FIG. 2 infra.

The chock 130 is also retained within the arms 120 and cradle 140, via one or more cables 150. It is contemplated that said cables 150 are comprised of a hardened metallic exterior coating to protect the cables 150 from the elements (e.g. water, debris, snow, sleet, oxidation, etc.) that may be encountered between the underside 11 of the trailer 10 and a roadway. It is also contemplated that an air brake/air hose assembly 168 of the system 100 may also be comprised of the same hardened metallic exterior coating to protect said structures from the same elements.

Figure 2:
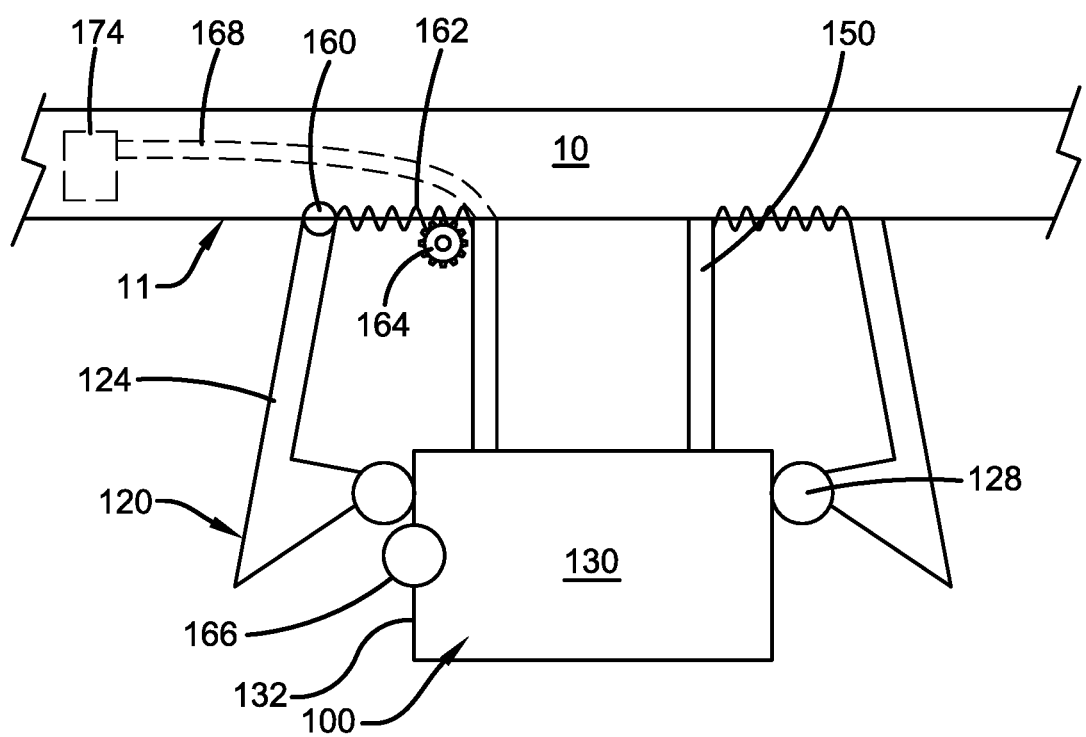
FIG. 2 illustrates a perspective view of one potential embodiment of the retractor and wheel chock of the improved wheel chock system of the present invention attached to the underside of a trailer bed and in the process of being deployed in accordance with the disclosed architecture.

FIG. 2 illustrates a perspective view of the retractor arms 120 and wheel chock 130 in the process of deploying the chock 130 of the improved wheel chock system 100 while attached to the underside 11 of a trailer bed 10 (shown as prior art). It is in this FIG. that the function of the arms 120 in relation to the chock 130 becomes fully apparent. More specifically, the arms 120 are comprised of at least one pair of metal springs 162 and a metal hinge 160, wherein the hinge 160 allows the arms 120 to extend outwards at an angle greater than 90 degrees in relation to the underside 11 of the trailer 10 and against the force of the springs 162. When the arms 120 extend away from the chock 130, which can be actuated by the release of the air brake of the vehicle, the wheels 128 of each arm 120 contact the sides 132 of the chock 130, thereby aiding the chock 130 in clearing the arms 120 and preventing friction-related damage as the chock 130 is being lowered into position via at the least one cable 150. Once the chock 130 has cleared the arms 120, the springs 162 return the arms 120 to their original stowed position at approximately 90 degrees in relation to the underside 11. In this manner, the springs 162 also serve to retain the chock 130 if the cable 150 were to break by keeping the arms 120 in the described stowed position as shown in FIG. 1.

When the chock 130 is being retracted, the springs 162 may be engaged by the existing air brake system or electric/manual powering system of the trailer 10 or vehicle, or the electrical/air hoses 168 of the system 100 to open the arms 120 against the back pressure of the springs 162. The cable 150 is also attached to a worm drive gear assembly 164, which allows the cable 150 to be retracted into the cradle 140, or against the underside 11 of the trailer 10 in embodiments of the device 100 that are not comprised of a cradle 140, such as the embodiment shown in FIG. 2. The worm drive 164 may be powered directly by the existing air brake/electrical system of the trailer 10 or vehicle, or may be powered by an electric motor/generator 174 that is in electrical communication with the worm drive 164 via the hoses/cables 168 or a manual hand crank assembly 182. The worm drive 164 may drive the cables 150 toward either the front on the front chock 130, or the back on the back chock 130 to unwind the cables 150 in such a way that the curvature of the cables 150 is convex in relation to the tires 12 of the vehicle or trailer 10. It is also contemplated that the superior corners of the chock 130 could further comprise one or more metal wheels 166 to reduce the likelihood of friction or wear from possibly coming into contact with the retractors 120.

Figure 3:
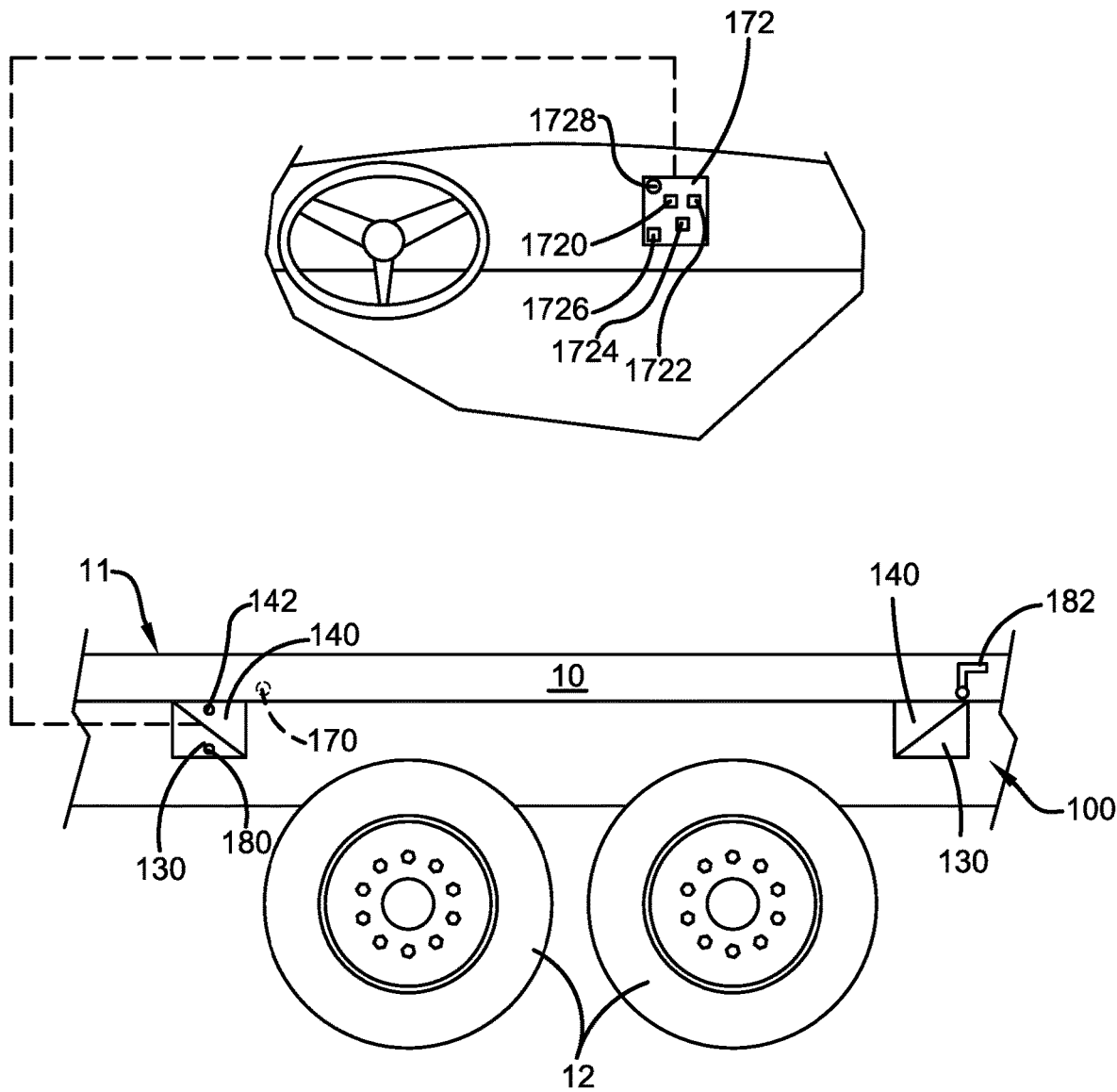
FIG. 3 illustrates a perspective view of a differing embodiment of the wheel chock system of the present invention, wherein the wheel chock is stored within a cradle while attached to the underside of a trailer bed in accordance with the disclosed architecture.

FIG. 3 illustrates a perspective view of a differing embodiment of the wheel chock system 100 of the present invention, wherein the chock 130 is stowed in a cradle 140, while attached to the underside 11 of a trailer bed 10. In this embodiment, the cradle 140 houses the worm drive 164, which as stated supra retracts and deploys the cable 150 from the cradle 140 and can be more fully observed in FIG. 4. In a differing embodiment of the system 100, the worm drive 164 may also be mounted directly to the underside 11 of the trailer 10 or vehicle. The worm drive 164 may be comprised of at least one gear of any shape, such as but not limited to: v-shaped gears or a v-shaped gear pattern, wherein the pattern/gear shape allows the worm drive 164 to move in two or more directions, such as up/down and/or left/right. This movement pattern ensures that the cable 150 is afforded more movement when in a deployed position, and ensures that any slack present will be drawn back up into the cradle 140, but not before the vehicle tire 12 comes into contact with the chock 130. It is also contemplated that the retractor arms 120 may be positioned within, or completely encompassed by, the cradle 140 so as to protect the arms 120 from any roadway debris that may strike and damage the same.

In a preferred embodiment, the cradle 140 is comprised of appropriate dimensions to allow for extra room to accommodate the cable 150 if it becomes unraveled or broken, and to ensure that it cannot shatter or protrude outwardly from the cradle 140. It is also appreciated that the cable 150 and electrical/air hoses 168 of the system 100 are secured in a manner underneath the trailer bed 10, wherein there is a degree of slack in both the cable 150 and the electrical/air hoses 168 so as to prevent tensioning thereof, which could lead to unintentional disconnection of either. The cradle 140 may also be comprised of a manual override button 142 to clear an unraveled cable 150 from the cradle 140.

Figure 4:
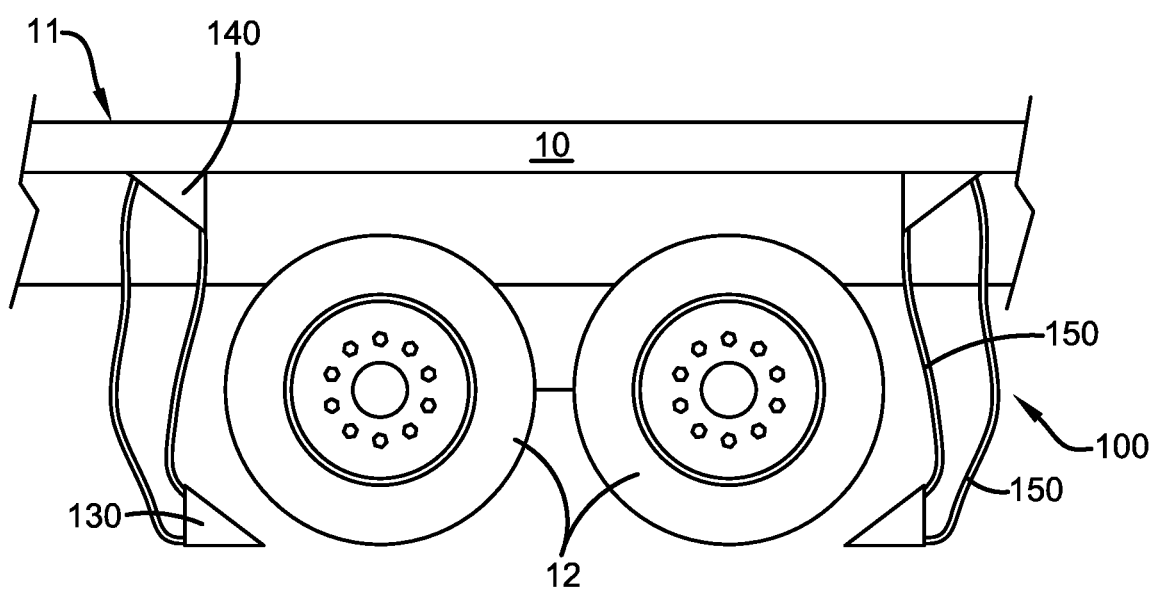
FIG. 4 illustrates a perspective view of a differing embodiment of the wheel chock system of the present invention, wherein the wheel chock is deployed from a cradle while attached to the underside of a trailer bed in accordance with the disclosed architecture.

FIG. 4 illustrates a perspective view of a differing embodiment of the wheel chock system 100 of the present invention, wherein the wheel chock 130 is deployed from a cradle 140 while attached to the underside 11 of a trailer bed 10. In the embodiment depicted in FIG. 4, the placement of the chock(s) 130 in front of and behind a pair of vehicle wheels 12 can be observed. The chock 130 and cradle 140 are both preferably shaped like a right-triangle, thereby forming a generally square combination when the chock 130 rests inside the cradle 140 (as best observed in FIG. 3). Notwithstanding, it is contemplated that the shape arrangement could be any combination of shapes without affecting the overall concept of the present invention. It is also important to note that in the deployed position, the cable 150 has a significant amount of excess slack. This is a purposeful design feature that is designed to allow the chock 130 to remain in place if the trailer 10 begins to move. For example, if no slack were present, the chock 130 would simply move forward with the trailer 10 and not engage the wheel 12 of the trailer 10, thereby defeating the purpose of a wheel chock 130.

Figure 5:
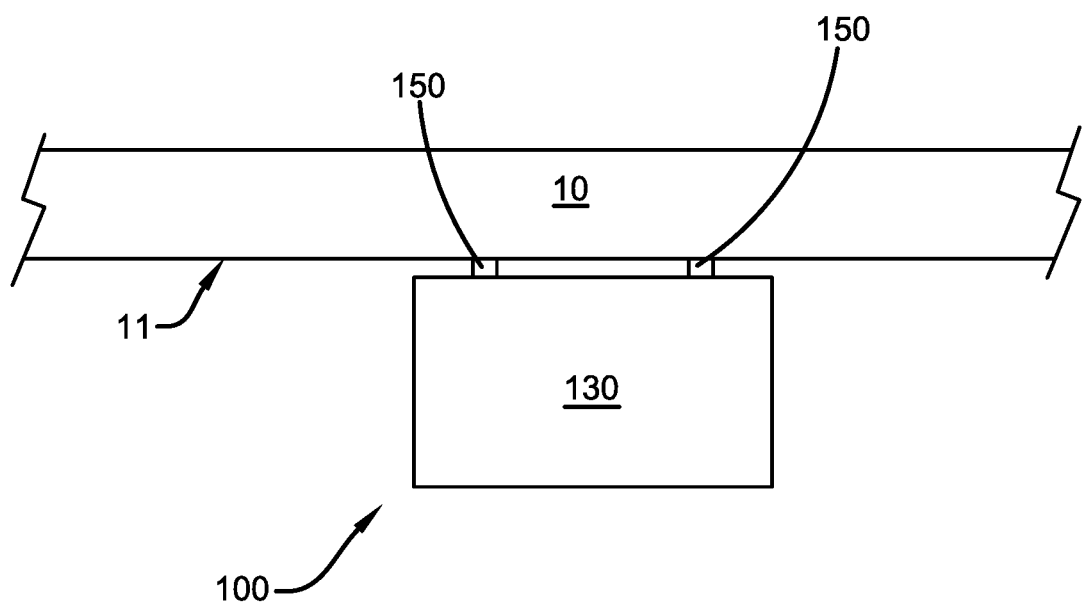
FIG. 5 illustrates a perspective view of yet another potential embodiment of the wheel chock system of the present invention in a stowed position and attached to the underside of a trailer bed in accordance with the disclosed architecture.
Figure 6:
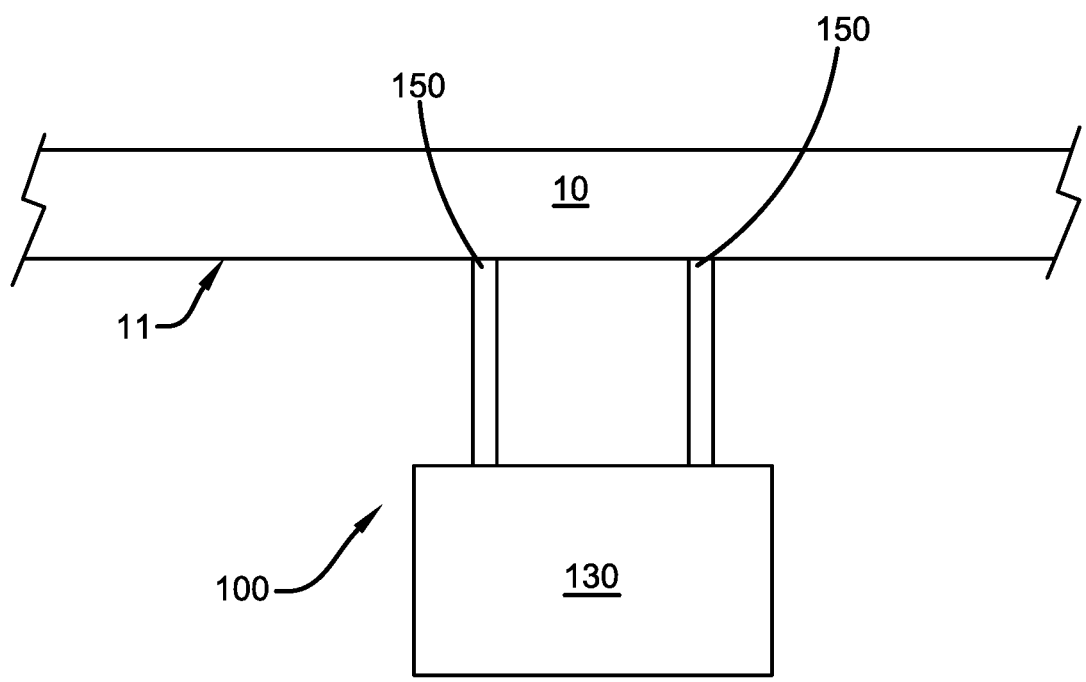
FIG. 6 illustrates a perspective view of yet another potential embodiment of the wheel chock system of the present invention in a deployed position while attached to the underside of a trailer bed in accordance with the disclosed architecture.

FIG. 5 illustrates a perspective view of yet another possible embodiment of the wheel chock system 100 of the present invention in a stowed position, while attached to the underside 11 of a trailer bed 10. More specifically, FIG. 5 serves to illustrate that the system 100 may exist without a cradle 140 and/or retractor arms 120, wherein the chock 130 is retained solely by the cable 150 which is attached to the worm drive 164 and trailer underside 11 as described supra. In addition, the deployment of the cable 150 can further be observed in FIG. 6.

As stated above, the system 100 may also be comprised of a plurality of sensors 170 and a visual indicator 172, wherein the indicator 172 alerts a user to the status of the chock 130 deployment from within the vehicle cab (not shown), based on the detection of the chock 130 within the cradle 140 via the sensors 170. More specifically, the sensors 170 may detect the positioning of the chock(s) 130 of the system 100 in real-time, and communicate the information to the indicator 172, wherein the indicator 172 may be in the form of an LED light board that can also be placed within a vehicle cab (not shown) or on any surface of the trailer 10.

The light board may have a green LED light 1720 that may be used to indicate that the chock 130 is in a stowed position and the vehicle is safe to move. A red LED 1722 may also be used to indicate that the chock 130 is in a deployed position, and the vehicle cannot be moved. In this embodiment of the indicator 172, the light board may also be comprised of a button 1724 that may be a 2" square plastic button oriented as a diamond, that allows a user to readily deploy or retract one or all of chocks 130 of the system 100 from within the cab or wherever the indicator 172 is located, thereby eliminating the need for the user to step out of the cab to control the system 100. In addition, the indicator 172 may be comprised of a speaker 1728 that alerts a user to the position of each chock 130 via a series of tones, sounds or phrases.

Furthermore, one embodiment of the system 100 may have at least one camera 180 that may be located on a chock 130, cradle 140 or cable 150 of the system 100. The camera 180 further allows a user to view the status and position of the chock 130, cradle 140 or cable 150 in real-time. It is also contemplated that the visual indicator 172 may be comprised of an LCD, LED or other conventional viewing display 1726 known in the art that allows a user to observe the view from the camera 180 from wherever the indicator 172 is positioned.

Notwithstanding the forgoing, the improved wheel chock system 100 can by any suitable size, shape and configuration as is known in the art without affecting the overall concept of the invention, provided that it accomplishes the above-stated objectives. One of ordinary skill in the art will appreciate that the shape and size of the system 100 and its various components, as show in the FIGS., are for illustrative purposes only, and that many other shapes and sizes of the system 100 and its components are well within the scope of the present disclosure. Although dimensions of the system 100 and its components (i.e., length, width, and height) are important design parameters for good performance, the system 100 and its various components may be any shape, size, or number that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A vehicle chock system that can be affixed to an underside of a vehicle or a trailer bed, the vehicle chock system comprising:
   a chock;
   a retractor arm having a flat surface that receives the chock, wherein the retractor arm comprises a wheel that contacts a side of the chock;
   a cable that lowers the chock into a position near a wheel of the vehicle or the trailer bed;
   a cradle that can house the cable;
   a worm drive further comprised of an at least one gear;
   a spring that allows the retractor arm to open;
   a hinge that allows the retractor arm to extend against the force of the spring;
   a visual indicator that alerts a user to the status of the chock deployment, wherein the visual indicator is further comprised of an LED light board;
   a sensor that detects the position of the chock and communicates said position to the visual indicator;
   a camera that allows a user to view the status of the chock, the cradle, and/or the cable in real time;
   an electrical/hair hose; and
   an electric motor that powers the worm drive.

2. The vehicle chock system of claim 1, wherein a set of retractor arms, the chock, and the cradle are positioned in front, behind, or in front and behind of a wheel of the vehicle or the trailer bed.

3. The vehicle chock system of claim 2, wherein the chock is further comprised of at least one metal wheel.

4. The vehicle chock system of claim 3, wherein the worm drive can move in two or more directions.

5. The vehicle chock system of claim 4, wherein the LED light board of the visual indicator is further comprised of a green LED light used to indicate that the chock is in a stowed position and the vehicle or the trailer bed is safe to move, a red LED used to indicate that the chock is in a deployed position and the vehicle or the trailer bed cannot be moved, a button means that allows a user to readily deploy or retract the chock, a viewing display that displays the video feed from the camera, and a speaker that alerts a user to the position of the chock via a series of tones, sounds, or phrases.

6. The vehicle chock system of claim 5, wherein the LED light board is located within a cab of the vehicle or the trailer bed.

7. The vehicle chock system of claim 6 further comprising a hand crank assembly that powers the worm drive.

8. The vehicle chock system of claim 7, wherein the hand crank assembly is manually operated.

* * * * *